United States Patent [19]

Gerow

[11] 3,832,830

[45] Sept. 3, 1974

[54] PERMEATION SEPARATION DEVICE

[75] Inventor: James A. Gerow, Newark, Del.

[73] Assignee: E. I. du Pont de Nemours and Company, Wilmington, Del.

[22] Filed: Sept. 18, 1972

[21] Appl. No.: 290,139

[52] U.S. Cl. .............................................. 55/158
[51] Int. Cl. .......................................... B01d 53/22
[58] Field of Search ................. 55/16, 158; 210/321

[56] References Cited
UNITED STATES PATENTS 3,339,341  9/1967  Maxwell et al. ...................... 55/158
3,616,928  11/1971  Rosenblatt ........................... 55/158

Primary Examiner—Charles N. Hart

[57] ABSTRACT

An improved selective permeation separation device comprising
1. a bundle of at least one million, preferably, at least five million, longitudinal hollow filament membranes which at least at one end are imbedded in and extend through a cast resin tube sheet characterized as having a wicked portion extending along the hollow filament membranes in the bundle,
2. a shell surrounding the bundle and providing an annular space for fluid around the bundle and sealed thereto in a fluid-tight relationship at each end having a cast resin tube sheet,
3. means for introducing a fluid mixture into the device so as to produce a permeate portion passing through the walls of the hollow filament membranes and a non-permeate portion which does not pass through the walls of the hollow filament membranes,
4. means for removing the non-permeate portion of the fluid mixture from the device,
5. means for removing the permeate portion of the fluid mixture from the device, and as the improvement,
6. at each end of the bundle having a cast resin tube sheet an elastic restraining element, under elastic tension, surrounding the bundle of fibers, extending from within the cast resin tube sheet along the bundle beyond the wicked portion of the tube sheet, and restraining and immobilizing the portions of the fibers which are within the confines thereof into an inflexible bundle.

6 Claims, 2 Drawing Figures

PERMEATION SEPARATION DEVICE

BACKGROUND OF THE INVENTION

1. Field of the Invention

This invention relates to a device or apparatus for contacting bundled hollow filament membranes with a fluid mixture in order to separate the components of the mixture by passage of the more permeable components through the membranes.

2. Description of the Prior Art

U.S. Pat. No. 3,339,341 discloses a device for the separation of the components of a fluid mixture by the selective permeation of the components through the walls of hollow filament membranes. The device consists essentially of a bundle of suitable hollow filament membranes surrounded longitudinally by at least one elongated flexible porous sleeve member, a cast resin tube sheet at each end of the bundle, the hollow filament membranes being imbedded in and extending through the tube sheet, a shell surrounding the bundle and sealed thereto at each end, means for introducing a fluid mixture into the interiors of the hollow filament membranes at one end of the bundle (that is, fiber side or bore side feed), means for removing from the interiors of the hollow filament membranes at the other end of the bundle the portion of the fluid mixture which does not permeate through the walls of the hollow filament (that is, fiber side or bore side recovery), and means for removing from the shell the portion of the fluid mixture which permeates through the hollow filament walls (that is, shell side recovery). Similar fluid permeation devices are disclosed in U.S. Pat. Nos. 3,228,876; 3,228,877; 3,422,008; 3,455,460; 3,475,331; 3,526,001; and 3,536,611.

Hollow filament permselective separation devices of a type such as disclosed in the aforesaid patents are particularly useful for separating the components of gaseous mixtures; for example, oxygen can be separated from nitrogen in air and hydrogen can be separated from carbon monoxide in mixtures thereof which are obtained as off-gases from chemical processes. Such separation processes are most efficient at high pressures since the rates of permeation of gases through polymeric membranes are, in general, proportional to the differences in the pressures of the gases on the two sides of the membranes; such separations also are more rapid at higher temperatures. Operation at the highest practical pressures and temperatures is, therefore, important in the commercial use of such devices.

It has been found that the highest practical operating pressures and temperatures for the commercial operation of such devices are limited by breakage of the hollow filament membranes near the tube sheets and particularly in regions near the tube sheet surfaces where resin has wicked into the filament bundles. For example, the practical operating pressures of devices containing hollow filaments having burst pressures above 1,000 p.s.i. have been limited to pressures below about 500 p.s.i. because of the breakage of large numbers of filaments in the wicked area upon attempted operation at significantly higher pressures. Particularly when operating at higher pressures and temperatures, as few as 0.1 percent broken filaments in such devices has a great effect on the degree of fluid separation obtained.

The aforesaid problem of wicking of fluid resin into filament bundles prior to setting of the resin has been mentioned in U.S. Pat. No. 3,342,729. U.S. Pat. No. 3,339,341 discloses the use of a flexible porous sleeve to compact the filament bundle. This patent also discloses a tube sheet casting technique which uses centrifugal force to assist penetration of the liquid resin into the tightly packed filament bundle. Such casting techniques reduce but do not completely prevent wicking of resin along the filaments into the bundle.

SUMMARY OF THE INVENTION

The invention herein relates to an improved device or apparatus for the selective permeation separation of components of a fluid mixture, which device comprises 1. a bundle of at least one million, preferably, at least five million, longitudinal hollow filament membranes which at least at one end are imbedded in and extend through a cast resin tube sheet characterized as having a wicked portion extending along the hollow filament membranes in the bundle,
2. a shell surrounding the bundle and providing an annular space for fluid around the bundle and sealed thereto in a fluid-tight relationship at each end having a cast resin tube sheet,
3. means for introducing a fluid mixture into the device so as to produce a permeate portion passing through the walls of the hollow filament membranes and a non-permeate portion which does not pass through the walls of the hollow filament membranes,
4. means for removing the non-permeate portion of the fluid mixture from the device,
5. means for removing the permeate portion of the fluid mixture from the device, and as the improvement, 6. at each end of the bundle having a cast resin tube sheet an elastic restraining element, under elastic tension, surrounding the bundle of fibers, extending from within the cast resin tube sheet along the bundle beyond the wicked portion of the tube sheet, and restraining and immobilizing the portions of the fibers which are within the confines thereof into an inflexible bundle.

DETAILED DESCRIPTION OF THE INVENTION

Figure 1:
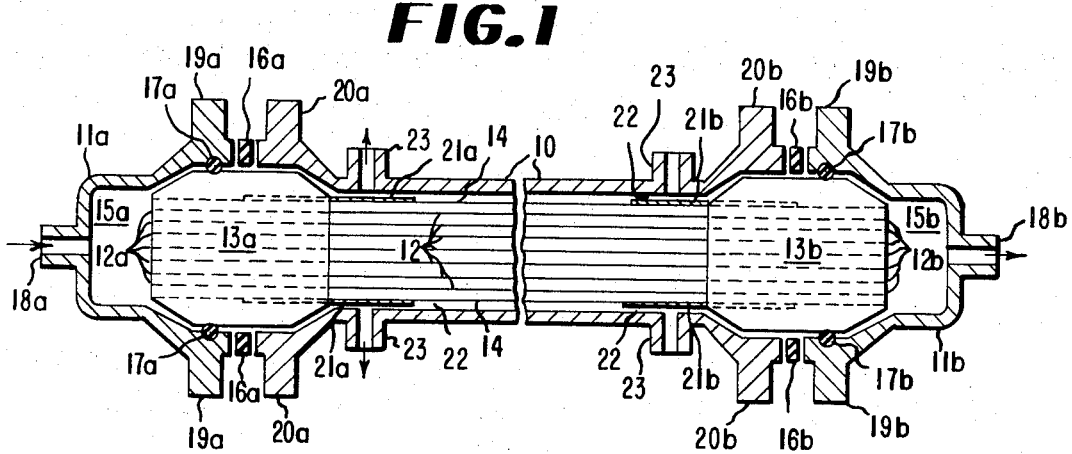
FIG. 1 is a longitudinal, schematic cross-sectional view of a permeation device of this invention showing the details of its construction.

The improved device of this invention has been briefly described above. The basis for the device of this invention resides, preferably, in either the double ended devices of U.S. Pat. No. 3,339,341 or the single ended devices of U.S. Pat. No. 3,526,001. In other words, the preferred embodiments of this invention represent improved devices over the devices of said patents. The invention will be more obvious from the following description of the double ended, bore side feed device of FIG. 1. A shell 10 with end closures 11a and 11b has assembled therein a bundle of hollow filament membranes 12 which are in longitudinal array so that their open ends 12a and 12b exit through pressure tight centrifugally cast resin tube sheets 13a and 13b. The bundle of hollow filaments is surrounded by flexible porous sleeve element 14 which also extends into centrifugally cast resin tube sheets 13a and 13b. The tube sheets effectively divide the interior of shell 10 from the fluid-containing end spaces 15a and 15b within end closures 11a and 11b by means of gasket seals 16a and 16b and O-ring seals 17a and 17b which, along with centrifugally cast tube sheets 13a and 13b, seal the bundle to the shell at each end of the bundle. End closures 11a and 11b include end openings 18a and 18b and are maintained in fluid-tight relationship with shell 10 by fastenings (not shown) at flanges 19a and 19b on the end closures and flanges 20a and 20b on the shell.

Figure 2:
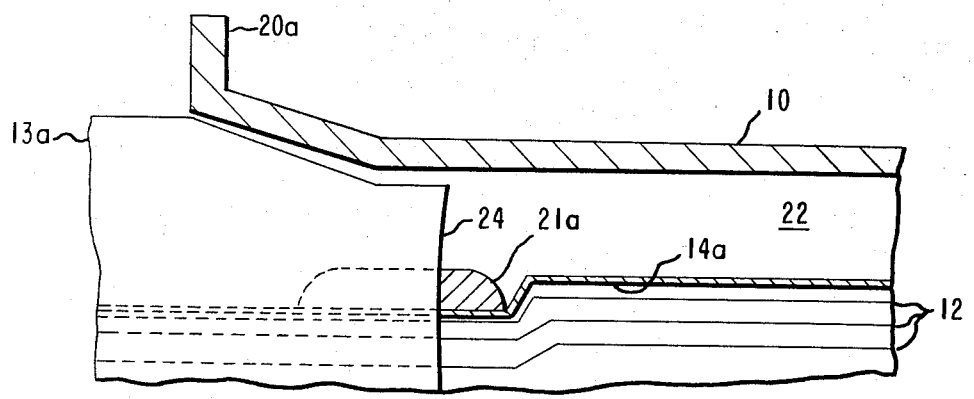
FIG. 2, which represents an expanded portion of a device of the type shown in FIG. 1, illustrates particular features of this invention.

The improved selective permeation separation device of this invention includes, in addition to the elements of the prior art described above, elastic restraining elements 21a and 21b, as defined above, which surround the ends of the bundle of hollow filament membranes and extend from within centrifugally cast resin tube sheets 13a and 13b into the adjacent annular space 22 between the bundle and the shell. The degree of restraint imposed on the bundle by the elastic restraining elements is shown in FIG. 2.

In operating the device illustrated in FIG. 1, a fluid feed mixture, for example, brackish water or a mixture of gases such as helium, hydrogen and carbon monoxide, is introduced under pressure through end opening 18a in end closure 11a into fluid-containing end space 15a and thence into the interiors of the ends 12a of hollow filament membranes 12. The more permeable component (or components) of the fluid feed mixture, for example, water, passes through the walls of the hollow filament membranes and flows into the interior of shell 10 to be removed through one or more side openings 23 (four shown in FIG. 1). The less permeable or residual component (or components) of the fluid feed mixture not passing through the walls of the hollow filament membranes passes from the interiors of the other ends 12b of the hollow filament membranes 12 into fluid-containing end space 15b in end closure 11b to be removed through end opening 18b. Alternatively, the flow can be reversed so that the fluid mixture enters through end opening 18b and residual fluid exits through end opening 18a. As already indicated, the above description applies to a bore side feed device. It is to be understood that a similar description can be given for a shell side feed device (with bore side recovery). Further, although these descriptions have been limited to a double ended device, similar descriptions can be given for a single ended device. For gas separations it is preferred to employ a double ended device having bore side feed.

The elastic restraining element surrounding and immobilizing the bundle of filaments in the device of this invention can be of any length and thickness provided it is appropriate to and can be conveniently assembled into the device while still achieving the benefits of the invention. Preferably, the element extends from approximately the longitudinal mid-point of a cast resin tube sheet into the adjacent annular space between the bundle and the shell and it comprises wrappings of one or more layers of woven tape in closetogether turns around the hollow filament membrane bundle. The element should extend into the annular space at least about one inch, and preferably at least about three inches, beyond the wicked area of the filaments in the bundle. Exemplary of the above, an element which is 4 to 12 inches long can extend about 2 to 6 inches into the tube sheet and 2 to 6 inches into the annular space between the bundle of filaments and the shell. Typically, the element is about 0.05 to 0.25 inch thick. Such an elastic restraining element restricts wicking of the liquid resin into the bundle during assembly of the permeation separation device and makes practical the operation of the device of this invention at increased pressures and temperatures, with consequent increased productivity, without significant increase in the breakage of the hollow filament membranes. Such increased operating pressures and temperatures are particularly obtained with hollow filament membranes of poly-(ethylene terephthalate) which are used for the separation of hydrogen and helium from other gases and for the separation of oxygen from nitrogen in air.

Although the preferred elastic restraining element is comprised of wrappings of woven tape, the restraining element also can be formed of one or more layers of cord, rope, belt or web wrapped in close-together turns around the bundle while retaining extension and tension sufficient to restrain the bundle. Alternatively, it can be of any construction or composition which is sufficiently elastic to stretch to the desired extent during application to a hollow filament membrane bundle, to conform to the size of the bundle upon partial relaxation, to adapt to a decreased size of the bundle during subsequent steps in the assembly of the device, and to restrain and immobilize the bundle so as to preclude subsequent outward expansion during use of the device. For example, the element can be of a unitary cylindrical construction of an elastomeric material, smaller in relaxed circumference than the circumference of the hollow filament membrane bundle in the device in which it is installed. Such a cylindrical element can be installed on a hollow filament membrane bundle by stretching to be larger than the bundle, slipping over an end of the bundle, and allowing to relax to the circumference of the bundle while retaining sufficient extension and tension to restrain and immobilize the bundle.

As already indicated, the restraining element is elastic; that is, it is of a composition or construction which can be, at practical tensions and without breaking, elastically extended to a degree sufficient for installation around the end of the hollow filament membrane bundle. Extension of the element during installation around a filament bundle involves elongation of the restraining element, either by increase in the circumference of the element or by increase in the length of any structure from which it is formed, of at least about 30 percent of the relaxed circumference or length. Since the restraining element should not crush the hollow filament membranes with which it comes in contact, the elongation of at least about 30 percent should be obtainable, without rupture of the element, at a tension which is less than the tension necessary to crush the hollow filament membranes during assembly of the element on the bundle. Such crushing tensions, when applied circumferentially, may be 200 to 1,000 p.s.i. in the direction of hollow filament membrane extension. Preferably, the elastic restraining element should be extendable without breaking to double its relaxed circumference at a tension of less than about 50 pounds per inch of length. Effective restraining elements used with poly(ethylene terephthalate) hollow filament membranes usually are extendable to about 50 to 500 percent at tensions of about 5 to 25 pounds per inch.

As noted above, the elastic element must restrain the hollow filament membrane bundle, that is, it must remain under sufficient tension after installation or formation around the bundle and during formation of the cast resin tube sheet to follow and promote any reduction in circumference or change in shape of the hollow filament bundle, as normally occurs, for example, in centrifugal casting. The pressures required for adequate restraint of the bundle can be quite small and may correspond to circumferential tensions in the restraining element of as little as about 0.5 pound per inch of length. Preferably, the circumferential tension in such a restraining element after formation of a cast resin tube sheet is greater than about 2 pounds per inch. In restraining elements used with poly(ethylene terephthalate) hollow filament membrane bundles, the circumferential tension usually is about 3 to 5 pounds per inch.

In accordance with the above, the circumference of that portion of the bundle within the confines of the elastic restraining element, that is, the inflexible portion of the bundle, is substantially smaller than that of the unpotted and unrestrained portion of the bundle, and therefore the degree of compaction of the bundle within the restrained portion as defined is greater than that of the unrestrained portion of the bundle. Normally the degree of compaction will be at least 70 percent, preferably at least 75 percent, calculated as follows:

$$\%C = (N D_f^2/D_r^2) \times 100$$

where
%C = percent compaction
N = number of hollow filaments of circular cross section in a bundle
$D_f$ = the outside diameter of the hollow filament
$D_r$ = the inside diameter of the confining zone having a circular cross section formed by the elastic restraining element surrounding the bundle of hollow filaments.

As is obvious from the above, the elastic restraining element also can be of a composition or construction which undergoes permanent deformation during installation or formation as long as it retains sufficient tension to restrain the bundle of fibers. An elastic restraining element is useful if it retains a tension of about 0.5 pound per inch of length at an extension of about 10 percent of its relaxed circumference. A particularly preferred elastic restraining element is a stretchable tape or web made with warp yarns of poly(ethylene terephthalate) fibers which have been crimped or textured so that yarns made therefrom are elastic. The warp yarns of such textured fibers can be made of continuous filament fibers or of cut staple fibers employing techniques well known in the textile art. Such a tape can be about 0.25 to 4 inches wide and can contain about 20 to 100 warp yarns per inch, the yarns being about 70 to 400 denier.

FIG. 2 shows in schematic cross section an expanded portion of one end of a device of the type shown in FIG. 1. The expanded portion shown in FIG. 2 illustrates the substantially decreased diameter of the bundle within the centrifugally cast tube sheet and that portion of the bundle restrained by the elastic restraining element in accordance with the invention. In FIG. 2 shell 10 with flange 20a encloses a bundle of hollow filament membranes 12 surrounded by a pair of flexible porous sleeve elements 14a. The hollow filament membranes 12 pass through centrifugally cast resin tube sheet 13a in fluid-tight relation thereto. The centrifugally cast resin tube sheet 13a may contain a reinforcing material such as a nylon tow which is placed around the bundle of filaments to center same in the tapered end section of the shell before the cast resin tube sheet is formed. Elastic restraining element 21a surrounds a portion of the bundle of filaments 12, which portion extends from within centrifugally cast resin tube sheet 13a into annular space 22 between the bundle of membranes 12 and shell 10. Restraining element 21a also surrounds a section of the pair of flexible porous sleeve elements 14a. In the embodiment of the device represented by FIG. 2 the inner surface 24 of centrifugally cast resin tube sheet 13a has a concave curved configuration such as is obtained when the cast resin tube sheet hardens while under the influence of centrifugal force in the assembly procedures described in U.S. Pat. No. 3,339,341. As already noted, the preferred embodiments of this invention represent improved devices of said patent. Bundles of hollow filament membranes suitable for use in the devices described herein can be assembled by procedures described in the patent. These procedures include spinning or extruding hollow filament membranes which are wound to form a hank of a desired length and width, depending upon the length and width of the shell of the assembled device, drawing the hank into an elongated form, and installing a flexible porous sleeve or sleeves over the elongated hank to aid in subsequent handling of the bundle. Hollow filament membranes useful in devices of the type described herein generally have outside diameters of about 10 to 250 microns, perferably 15 to 150 microns, and wall thicknesses of about 2 to 75 microns, preferably 5 to 40 microns. In general, the filaments with smaller outside diameters should have thinner walls so that the ratio of the cross-sectional area of the internal bore of the filaments to the total cross-sectional area within the outer perimeter of the filaments is about 0.12:1 to 0.60:1. Preferably, the ratio is about 0.18:1 to 0.45:1. Such hollow filament membranes can be prepared by extrusion of polymer melts or solutions through circular dies and spinnerets as is known in the textile spinning art. The hollow filament membranes can be of any organic composition which exhibits selective permeation toward the components of the fluid mixture to be separated. Typical membrane materials which can be used include, but are not limited to, olefinic resins of monomers containing two to four carbon atoms, such as polyethylene, polypropylene, poly(ethylene-butene) and ethylene-propylene-butene terpolymers; polyamides; polyesters, such as poly(ethylene terephthalate); fluoropolymers, such as polymers of tetrafluoroethylene and hexafluoropropylene; acrylic resins; polystyrene; poly(vinyl chloride); polyacrylonitrile; poly(vinyl formal); polyurethane; and cellulose ethers and esters, such as ethyl cellulose, cellulose acetate and cellulose acetate butyrate. A preferred membrane material is poly(ethylene terephthalate).

The flexible porous sleeve which is drawn over a loose hank in forming a bundle of hollow filament membranes for the device of this invention can be made of any suitable material of suitable strength and compatability with the fluid mixture to be processed, the polymer from which the hollow filament membranes are made, the material forming the cast tube sheets, and the other materials with which the sleeve will come into contact. The sleeve member can be of any practical construction which is porous and flexible. Preferably, the sleeve member is of a strong abrasion resistant material and construction and is capable of shrinkage or shortening at least in the transverse peripheral dimension to give a uniform compacting action on and along the enclosed bundle of filaments when the sleeve is placed under tension longitudinally. A preferred construction is a circularly knit fabric of a suitable material, such as cotton or polyester thread. Such a sleeve facilitates positioning the bundle in the shell without flattening or damaging the filament membranes in the bundle. It is to be understood that the aforesaid flexible porous sleeve member does not meet the requirements of the elastic restraining element of this invention in that it does not provide the immobilization of hollow filaments that is necessary to prevent breakage of the filaments in the wicked area of the bundle during use.

The cast resin tube sheet members of the device of this invention can be made of any of a large variety of suitable hardenable liquid resins, including polyester, phenolic, melamine, silicone and epoxy resins. A particularly preferred resin material which provides good strength is a mixture of an epoxy polymer modified with butyl glycidyl ether, a modified aliphatic amine adduct and triphenyl phosphite. Cast tube sheets of such materials can be formed, for example, by the centrifugal casting procedures described in U.S. Pat. No. 3,339,341. In the formation of the cast resin tube sheet, regardless of the procedure employed, the amount of liquid resin around the end of the fiber bundle is controlled so that the tube sheet will enclose the end of the filament bundle, including a part of the elastic restraining element. The amount of resin should not be such that wicking will occur beyond the confines of the zone restrained by the elastic restraining element. When centrifugal casting is employed, the preferred method of forming the tube sheet, the liquid resin is allowed to set while the bundle is under centrifugal force with the result that both the potted portion of the bundle and that portion of the bundle that is confined by the elastic restraining element are highly compacted and immobilized. After formation, the tube sheet can be cut to reopen the hollow filament membranes by procedures such as those described in U.S. Pat. No. 3,507,175.

The device of this invention is useful at pressures and temperatures which result in significant increases in the rates of permselective separations, without increased filament membrane breakage. For example, a device containing about 40 million poly(ethylene terephthalate) hollow filament membranes with elastic restraining elements in the form of wrapped elastic tapes of textured yarns of the same polymer can be used at pressures of at least 650 p.s.i. and at temperatures as high as 110°F. for the separation of oxygen from nitrogen in air with a total filament breakage during device production and operation which is frequently less than 2,000 (0.005%) and seldom as large as 20,000 (0.05%). Similar devices without elastic restraining elements can be operated continuously only at pressures up to about 500 p.s.i. at temperatures below 70°F. with low total filament breakage, but extensive filament breakage, for example, at least 40,000 broken filaments (0.1%), occurs upon operation for a few hours at pressures near 500 p.s.i. at temperatures near 100°F. or upon operation at pressures above about 600 p.s.i. at temperatures near 70°F.

The number of broken filaments present in a selective permeation separation device of the type described herein can be determined by taking advantage of the fact that changing pressure has different effects on the rate of permeation of a fluid through a membrane and on the rate of flow of a fluid from a capillary tube. The total flow of fluid from a collection of hollow filament membranes containing broken filaments at any pressure is the sum of the actual permeability flow through the membranes and the leakage flow from broken filaments. The permeability flow depends on the effective membrane area, the effective pressure and the permeability of the fluid through the membrane as indicated by the well known equations of Fick. The leakage flow from broken filaments depends on the effective filament diameter and length, the viscosity of the fluid and the effective pressure as indicated by the well known equations of Poiseuille and Bernouli. In practice, the actual flow of fluid from a selective permeation separation device is determined at several pressures. With gaseous fluids a straight line is obtained upon plotting the ratio of the flow at each pressure to the pressure as a function of the ratio of the pressure to the product of the gas viscosity and the temperature. The slope of this straight line in the plot is related to the number of leaking filaments and the intercept of this line with the axis is related to the actual permeability of the fluid through the membrane. This is explained more fully in the following example which illustrates a preferred procedure for assembling a device of this invention and demonstrates the benefits of the invention.

EXAMPLE

A. Preparation of Hollow Filament Membranes

Hollow filament membranes were made of textile fiber grade poly(ethylene terephthalate) by melt-spinning with a 72-hole spinneret using the techniques described in U.S. Pat. No. 3,397,427. The individual filaments of the 72-filament yarn had an average outside diameter of 35.8 microns and an average inside diameter of 18.0 microns, corresponding to an average ratio of internal cross-sectional area to total cross-sectional area of 0.25:1. The burst strength of the filaments (the internal pressure at which the first filament of a sample breaks in a water bath) was 1,400 p.s.i. at 104°F.

B. Assembly of Permselective Separation Device

A large hank of continuous hollow filament membranes was assembled substantially as described in U.S. Pat. No. 3,339,341. The hank was stretched between two supports to obtain a bundle containing about 39.8 million parallel hollow filament membranes. The bundle was enclosed in two flexible porous sleeves of knit poly(ethylene terephthalate) fibers substantially as described in said patent. The bundle was mechanically formed into a substantially uniformly packed cylindrical shape which had a circumference of about 37 inches and a nominal length of about 16 feet. With the bundle hanging vertically under tension from its own weight, a third layer of flexible porous sleeve material was slipped over the upper end of the bundle for a distance of about 25 inches. Beginning at a distance of about 7.5 feet from the center of the bundle, the upper end of the bundle was further reduced in circumference for a length of about 12 inches toward the center of the bundle by wrapping with an elastic woven tape. This tape was woven in a 2×2 twill style with 64 ends per inch across a reed width of 3 inches and with about 10 picks of filling yarn per inch, using as warp and filling a 150 denier yarn containing about 40 textured continuous poly(ethylene terephthalate) filaments. The woven tape was boiled-off, thereby reducing the width to about 2 inches and increasing the crimp of the filaments and the elasticity of the yarn. During the wrapping of the hollow filament membrane bundle, the tape was maintained under a tension of about 8 pounds, sufficient to elongate the tape about 80 percent, so as to assist in the reduction in the circumference of the bundle. In the finished wrapping the tape maintained a tension of about 1 pound, sufficient to elongate it about 60 percent from its initial length and about 40 percent from its relaxed length. The tape was applied in about 35 overlapping turns in two layers to obtain a circumferential tension in the resulting elastic restraining element of about 3 pounds per inch of wrapped length. The final circumference of the wrapped portion of the bundle was about 33 inches. An outer layer of moderately packed nylon tow yarn was fastened uniformly over the wrapped section of the bundle to build up the circumference to about 38 inches.

The above wrapping procedure was repeated at the other end of the bundle. The hollow filament membrane bundle enclosed in flexible sleeve layers and with wrapped elastic restraining elements near its two ends was installed in a cylindrical shell with a nominal diameter of 12 inches and a length of 14 feet between flanges. Moderately packed nylon tow was placed within the outermost flexible sleeve so as to fill the space at each end between the bundle and the inside of the tapered end section of the shell. Mold caps were attached at each end of the shell and epoxy resin tube sheets were centrifugally cast at each end substantially as described in U.S. Pat. No. 3,339,341. The amount of resin used was sufficient to fill the mold caps and to extend into the shell for a distance of about 5 inches to a zone which included about half of the portion of each end of the bundle which was wrapped with the elastic restraining elements. The mold caps were removed, the ends of the resin castings were cut off about two inches from the faces of the end flanges of the shell substantially as described in U.S. Pat. No. 3,507,175, and gasketed end closures were attached to complete assembly of the selective permeation separation device.

C. Evaluation of Device

The above device was installed in a constant temperature chamber and held for the lengths of time at the indicated temperatures and pressures (nitrogen pressurized) inside the hollow filament membranes as shown in Table I.

Table I

| Exposure | | Conditions | |
|---|---|---|---|
| Cumulative Hours | Interval Hours | Temperature °F. | Pressure p.s.i.g. |
| 120 | 120 | 106 | 40 |
| 160 | 40 | 101 | 500 |
| 190 | 30 | 101 | 550 |
| 334 | 144 | 101 | 40 |
| 358 | 24 | 101 | 550 |
| 382 | 24 | 101 | 600 |

Table I-Continued

| Exposure | | Conditions | |
|---|---|---|---|
| Cumulative Hours | Interval Hours | Temperature °F. | Pressure p.s.i.g. |
| 402 | 20 | 101 | 650 |

The maximum rated operating pressure of the shell of this device was 650 p.s.i. Periodically during the exposure the rate of nitrogen flow from the shell of the device was determined at successively reduced pressures within the hollow filament membranes. A typical set of data, obtained at the end of the exposure program, is summarized in Table II. The nitrogen flows from the device, the operating pressures and the dimensions of the membranes were used to calculate for each test pressure an effective permeability coefficient. The effective permeability coefficient is larger than the true or actual permeability coefficient because it includes flow from broken and leaking filaments. The true permeability coefficient was estimated from the observed flow and applied pressure by plotting the ratio of these numbers as a function of the ratio of the applied pressure to the product of the known viscosity of nitrogen (at each operating pressure and temperature) and the absolute temperature. The zero pressure intercept of a best straight line drawn among the points of this plot indicated that the true permeability coefficient for a similar device containing no broken filaments and operating at 101°F. is 1.31 centibarrers, corresponding to a nitrogen flow from a similar device containing no broken filaments of 1.1304 standard cubic feet per minute (s.c.f.m.) with an operating pressure of 500 p.s.i.g. The slope of the best line drawn among the points indicated the number of broken filaments was 5,368 (0.013 percent of the total number of filaments in the bundle). The slopes of lines from each of the plotted points to the zero pressure intercept of the best line provided bases for estimating the number of broken filaments during each set of test conditions. The data are given in Table II.

TABLE II

| Test Number | Nitrogen Pressure (p.s.i.g.) | Nitrogen Flow (s.c.f.m.) | Effective Permeability Coefficient | Estimated Broken Filaments |
|---|---|---|---|---|
| 1 | 649 | 2.0040 | 1.791 | 4,464 |
| 2 | 485 | 1.4152 | 1.693 | 5,371 |
| 3 | 405 | 1.1414 | 1.635 | 6,220 |
| 4 | 315 | 0.8468 | 1.560 | 5,876 |
| 5 | 203 | 0.5147 | 1.471 | 5,102 |

The embodiments of the invention in which an exclusive property or privilege is claimed are defined as follows:

1. An improved selective permeation separation device comprising
    1. a bundle of at least one million longitudinal hollow filament membranes which at each end are imbedded in and extend through a cast resin tube sheet characterized as having a wicked portion extending along the hollow filament membranes in the bundle,
    2. a shell surrounding the bundle and providing an annular space for fluid around the bundle and sealed thereto in a fluid-tight relationship at each end having a cast resin tube sheet,
3. means for introducing a fluid mixture into the device so as to produce a permeate portion passing through the walls of the hollow filament membranes and a non-permeate portion which does not pass through the walls of the hollow filament membranes,
4. means for removing the non-permeate portion of the fluid mixture from the device,
5. means for removing the permeate portion of the fluid mixture from the device, and as the improvement, 6. at each end of the bundle having a cast resin tube sheet an elastic restraining element, under elastic tension, surrounding the bundle of fibers, extending from within the cast resin tube sheet along the bundle beyond the wicked portion of the tube sheet, and restraining and immobilizing the portions of the fibers which are within the confines thereof into an inflexible bundle.

2. The improved device of claim 1 wherein the hollow filament membranes are poly(ethylene terephthalate) membranes and the elastic restraining elements are of poly(ethylene terephthalate).

3. The improved device of claim 2 wherein the elastic restraining elements are comprised of wrappings of woven tape made from warp yarns.

4. The improved device of claim 1 wherein the bundle contains at least five million longitudinal hollow filament membranes.

5. The improved device of claim 1 which is double ended and adapted for bore side feed of the fluid mixture.

6. The improved device of claim 5 which is employed in a gas separation process.

* * * * *